(No Model.)
C. A. VANWAGENER.
LIFTING DEVICE.
No. 556,837. Patented Mar. 24, 1896.
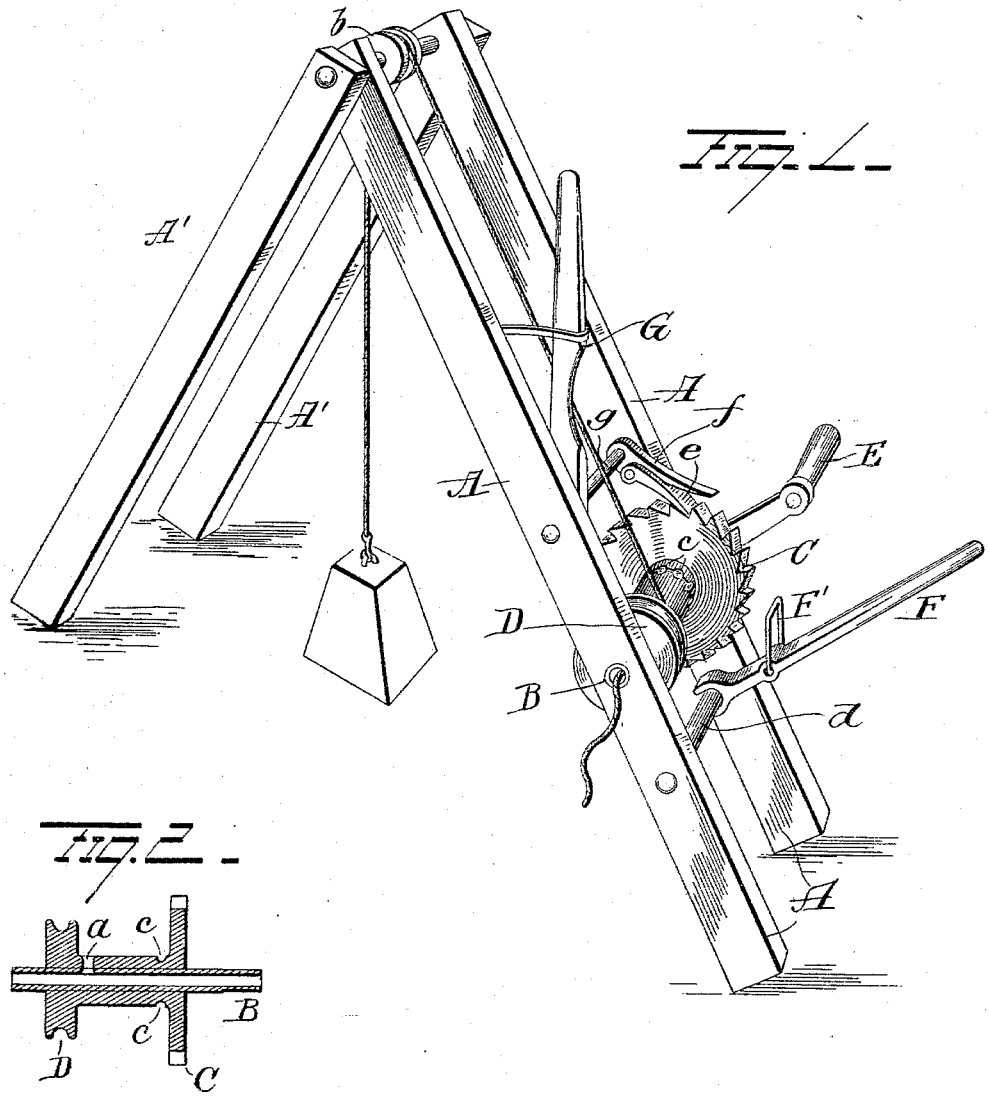

UNITED STATES PATENT OFFICE.

CORNELIUS A. VANWAGENER, OF ELLENVILLE, NEW YORK.

LIFTING DEVICE.

SPECIFICATION forming part of Letters Patent No. 556,837, dated March 24, 1896.

Application filed March 13, 1895. Serial No. 541,643. (No model.)

*To all whom it may concern:*

Be it known that I, CORNELIUS A. VANWAGENER, a resident of Ellenville, in the county of Ulster and State of New York, have invented certain new and useful Improvements in Lifting Devices; and I do hereby declare the following to be a full, clear, and exact description of the invention, such as will enable others skilled in the art to which it appertains to make and use the same.

My invention relates to an improvement in lifting devices, and more particularly to such as are adapted for extracting stumps and lifting weights of various kinds, the object of the invention being to produce a device of the class specified which shall be simple in construction, durable, easy to operate and control, and which shall be effectual in all respects in the performance of its functions.

With this object in view the invention consists in certain novel features of construction and combinations and arrangements of parts, which will be hereinafter set forth, and pointed out in the claim.

In the accompanying drawings, Figure 1 is a view illustrating my improvements. Fig. 2 is a detail view.

A A represent parallel standards adapted to be supported normally in an oblique position by means of suitable posts or braces A' or in any other suitable manner.

In the lower portions of the standards A a hollow shaft B is journaled and provided at its respective ends with a ratchet-wheel C and a grooved brake-wheel D, said shaft and wheels thus constituting a drum or windlass on which a rope or chain is adapted to be wound. One end of the rope or chain is passed through a hole *a* in the hollow shaft and out through one end of said shaft and adapted to be grasped by the operator when it is desired to draw said rope or chain taut and cause it to wind on the shaft or drum when the latter is turned. The other end of the rope or chain is passed upwardly and over a pulley *b*, mounted on a suitable shaft at the upper ends of the standards, the free end of said rope or chain being provided with a suitable device whereby to attach it to the weight to be lifted or the stump to be extracted. It may in some cases be desired to operate the device with a chain without permitting the latter to be wound on the shaft or drum, in which case I provide said shaft or drum with a series of notches *c* for the reception of the links of such chain. The shaft may be solid, if preferred.

The shaft or drum can be rotated by means of a crank-arm E, removably attached thereto. When heavy weights are to be raised, I provide a lever F, removably fulcrumed at its lower end on a cross-bar *d*, secured to the standards A and provided with a latch or clevis F', adapted to engage the teeth of the ratchet-wheel C.

Retrograde movement of the shaft or drum will be prevented by means of a dog *e*. The dog *e* is pivotally connected to a lever *f* at a point between the ends of the latter, said lever being pivotally connected to a shaft or cross-bar *g*, secured to the standards A and bearing at its free end on the dog *e* at a point in proximity to the free end of the latter. From this construction and arrangement of parts it will be seen that when the parts are in their normal working positions any tendency of the drum to rotate backward will cause a pressure against the dog *e*, and the fulcrum of said dog being below the fulcrum of the lever to which it is pivoted the free end of said lever will be pressed tightly down on the free end of the dog, and the lever will be prevented from turning on its fulcrum. When it is desired to release the drum, it is simply necessary to raise the free end of the lever *f*, thus raising the fulcrum of the dog *e* and permitting the teeth of the ratchet-wheel to pass it. It is evident that the drum may be thus released very easily and quickly when there is a large amount of weight or resistance on the cord or chain wound on said drum.

In order to control the retrograde movement of the drum, I provide a brake-lever G, which is pivotally connected with the cross-bar *g* and adapted to be brought into contact with the grooved brake-wheel D.

My improvements are very simple in construction, are easy to operate and control, and are effectual in all respects in the performance of their functions.

Having fully described my invention, what I claim as new, and desire to secure by Letters Patent, is—

The combination with a suitable support, and a drum revolubly supported therein, said drum having a ratchet-toothed wheel and a brake-wheel thereon, and provided with a hole which extends through the axis of the drum and out at a point between the ratchet-toothed and brake wheels, said hole adapted to receive an end of the hoisting-cable and the two wheels on the drum serving the function of confining the cable therebetween, of a lever, a bail hinged thereto and adapted to engage the teeth of the ratchet-toothed wheel whereby the latter is operated and a brake-lever which operates in connection with the brake-wheel, substantially as set forth.

In testimony whereof I have signed this specification in the presence of two subscribing witnesses.

CORNELIUS A. VANWAGENER.

Witnesses:
SAM B. LOW,
TULLY H. GRAY.